No. 897,644. PATENTED SEPT. 1, 1908.
W. F. McCULLOCK.
JACK.
APPLICATION FILED OCT. 11, 1907.
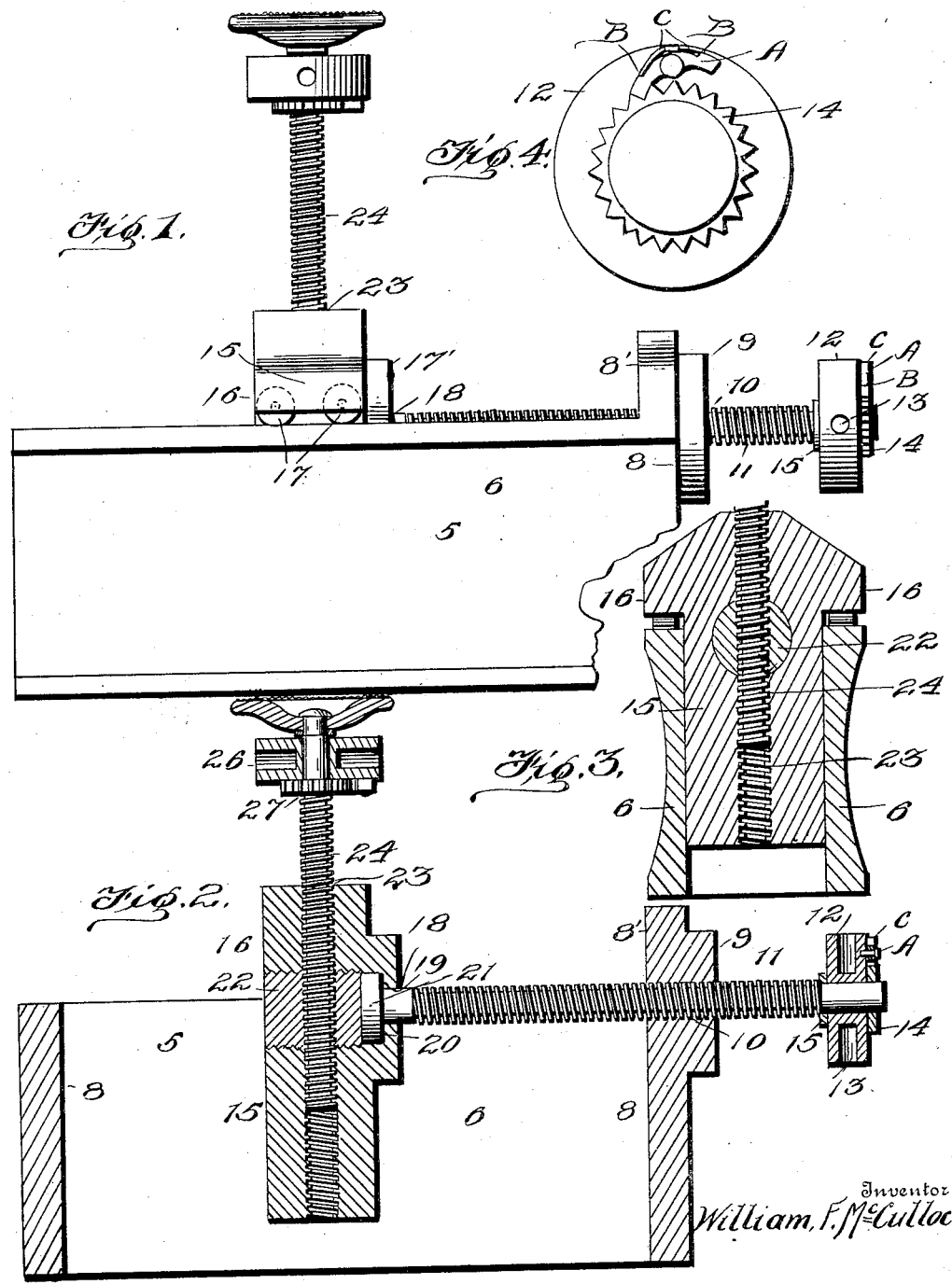
Witnesses
Geo. L. Thom
E. L. Chandlee
Inventor
William F. McCullock
By Woodward & Chandlee
Attorneys
THE NORRIS PETERS CO., WASHINGTON, D. C.

UNITED STATES PATENT OFFICE.

WILLIAM F. McCULLOCK, OF WASHINGTON, DISTRICT OF COLUMBIA.

JACK.

No. 897,644.  Specification of Letters Patent.  Patented Sept. 1, 1908.

Application filed October 11, 1907. Serial No. 397,017.

*To all whom it may concern:*

Be it known that I, WILLIAM F. McCUL-LOCK, a citizen of the United States, residing at Washington, in the District of Columbia, have invented certain new and useful Improvements in Jacks, of which the following is a specification.

This invention relates to jacks, and more particularly to lifting jacks, and has for its object to provide a jack so arranged that a wagon or other body may be lifted thereby and may be also shifted laterally thereby.

Another object is to provide a jack of simple arrangement and structure, which may be manufactured at a low figure and which will not be likely to become deranged or broken.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of the present jack, Fig. 2 is a longitudinal section through the jack, Fig. 3 is a transverse section taken through the sliding member. Fig. 4 is a view showing the ratchet mechanism.

Referring now to the drawings, there is shown a base member 5 which is cast integral, and which includes parallel spaced side walls 6, a bottom 7, and transverse end walls 8. The forward end wall has an upwardly projecting flange 8' extending above the side walls, and formed on the forward face of the forward end wall 8, there is a circular boss 9, this boss extending upwardly over the flange 8'. A threaded horizontal passage 10 is formed through the boss 9 and through the forward wall of the base member, for the reception of a horizontally extending jack screw 11, having a head 12 at its outer end connected with the stem of the screw by means of a ratchet mechanism for rotation of the screw with the head in one direction only. The head is provided with sockets 13 for the reception of an operating bar, as will be understood.

The ratchet connection is shown in Fig. 4 of the drawings, and includes an arcuate double ended dog A pivoted upon the outer face of the head 12. This arcuate dog A is shiftable to bring its end into engagement with an outwardly extending toothed portion 14 of the stem 11, it being seen from the drawings that the stem extends completely through the head 12, the latter being prevented from moving inwardly by a shoulder 15 formed upon the stem.

In the convex face of the dog A, adjacent to each end thereof, there is formed a notch B, and strap springs C are secured at one end to the head 12, and are arranged for engagement of their opposite ends in the corresponding notches B. It will thus be seen that when one of the springs C is engaged in its notch, one end of the dog will be held in engagement with the toothed portion 14 of the stem, so that the head is free to move in one direction only. When the other spring C is engaged in its notch, rotation of the head in the opposite direction only is permitted.

A sliding block 15' has its lower portion engaged between the side walls 6 of the base member, and includes lateral wings 16 recessed in their under faces to receive rollers 17, extending transversely and resting upon the upper edges of the walls 6. The block 15' is thus arranged to slide longitudinally of the base member.

Formed upon the forward face of the block 15', there is a boss 17', and a horizontal passage 18 is formed through the boss and to the block. The forward portion of this passage is reduced, as shown at 19, so that a rearwardly directed shoulder 20 is formed which receives thereagainst a head 21 carried by the rearward end of the screw 11, which, as will be understood, is engaged in the passage. After the screw has been thus positioned, the rearward portion of the passage is closed by means of a suitable plug 22, as shown. A vertical passage 23 is formed through the block 15', as shown, and is threaded to receive the threaded stem 24 of a vertically extending jack screw 25, this jack screw having a head 26 connected therewith by ratchet mechanism.

The ratchet mechanism is indicated at 27, and is similar to that described in connection with the jack screw 11 except that it is located at the under side of the head.

From the above, it will be seen that bodies may be raised by means of the jack screw 25, and that by operation of the jack screw 11, the block 15' and the body supported by the screw 25 may be shifted horizontally.

What is claimed is:

In a jack, the combination with a screw stem having a shoulder adjacent to one end, of a head having a passage therethrough in which the portion of the screw beyond the shoulder is engaged, said screw extending outwardly beyond the head, said outwardly extending portion being provided with ratchet teeth, an arcuate dog pivoted upon the outer face of the head for movement to bring its ends into interchangeable engagement with the ratchet teeth, said dog having notches adjacent to its ends, and springs arranged for removable engagement in the notches, said springs when in the notches being arranged to hold the dog with the adjacent end in engagement with the ratchet teeth.

In testimony whereof I affix my signature, in presence of two witnesses.

WILLIAM F. McCULLOCK.

Witnesses:
LILLIE M. PETERS,
M. A. BECKHAM.